(12) United States Patent
Artis et al.

(10) Patent No.: US 7,900,340 B2
(45) Date of Patent: Mar. 8, 2011

(54) METHOD OF FABRICATING AN ANTENNA THAT INCLUDES A SERPENTINE FEED WAVEGUIDE COUPLED IN PARALLEL TO A PLURALITY OF RADIATING WAVEGUIDES

(75) Inventors: Jean-Paul Artis, Plouzane (FR); Gérard Debionne, Mery sur Oise (FR); Jean-François Dupire, Fontenay-le-Fleury (FR)

(73) Assignee: Thales (FR)

( * ) Notice: Subject to any disclaimer, the term of this patent is extended or adjusted under 35 U.S.C. 154(b) by 288 days.

(21) Appl. No.: 12/147,016

(22) Filed: Jun. 26, 2008

(65) Prior Publication Data
US 2009/0300901 A1 Dec. 10, 2009

(30) Foreign Application Priority Data
Jul. 6, 2007 (FR) ...................................... 07 04910

(51) Int. Cl.
*H01P 11/00* (2006.01)
(52) U.S. Cl. .......................................... 29/600; 343/771
(58) Field of Classification Search ..................... 29/600, 29/825, 830–832, 846–847; 343/770–772
See application file for complete search history.

(56) References Cited

U.S. PATENT DOCUMENTS

| 3,473,162 | A | | 10/1969 | Veith |
| 4,099,181 | A | * | 7/1978 | Scillieri et al. ................. 343/777 |
| 4,742,355 | A | * | 5/1988 | Wolfson et al. ............... 342/375 |
| 6,972,727 | B1 | | 12/2005 | West et al. |
| 6,996,321 | B2 | * | 2/2006 | Sasaura et al. ................ 385/132 |

FOREIGN PATENT DOCUMENTS

| FR | 2886771 | 12/2006 |
| FR | 2886773 | 12/2006 |

* cited by examiner

*Primary Examiner* — Minh Trinh
(74) *Attorney, Agent, or Firm* — Lowe Hauptman Ham & Berner, LLP

(57) ABSTRACT

A method of fabricating an antenna including a plurality of radiating waveguides disposed so that their wave paths are parallel two by two and including a feed waveguide having a wave path forming a flat zigzag serpentine pattern. The feed waveguide is disposed against the radiating waveguides so that a longitudinal axis of the feed waveguide pattern intersects the radiating waveguides at an angle of substantially 90 degrees. The feed waveguide includes coupling elements on its face in contact with the radiating waveguides. The radiating waveguides are straight and the straight portions of the zigzag wave path in the feed waveguide form a non-zero angle with the wave paths of the radiating waveguides, so that the coupling elements feed the radiating waveguides.

11 Claims, 4 Drawing Sheets

METHOD OF FABRICATING AN ANTENNA THAT INCLUDES A SERPENTINE FEED WAVEGUIDE COUPLED IN PARALLEL TO A PLURALITY OF RADIATING WAVEGUIDES

RELATED APPLICATIONS

The present application is based on, and claims priority from, French Application Number 07 04910, filed Jul. 6, 2007, the disclosure of which is hereby incorporated by reference herein in its entirety.

FIELD OF THE INVENTION

The present invention relates to an antenna including a serpentine feed waveguide coupled in parallel to a plurality of radiating waveguides. It is applied in the field of airborne meteorological radar systems, for example.

BACKGROUND OF THE INVENTION

A meteorological radar system locates precipitation such as rain, snow or hail, measures their intensity, and possibly identifies hazardous phenomena. Most meteorological radar systems are installed on the ground and are often part of a much larger meteorological surveillance network. More and more airborne applications are seeing the light of day, however, air transport being particularly concerned with meteorological phenomena. It is notably a question of circumventing cumulonimbus clouds, which are enormous clouds of which pilots are very nervous because they sometimes give rise to violent storms. Even airliners divert their route to avoid crossing the path of certain particularly menacing cumulonimbus cloud formations. Lightning, hail, and strong wind shears in the cloud are added to the risk of icing up and can endanger the flight if the pilot attempts to fly through.

A meteorological radar system detects the large voluminous targets that clouds represent. It must give the position, the size and the speed of the elements of the cloud, and then deduce therefrom its danger level. To do this, a meteorological radar system can emit a wave in the X band, for example. The distance to the elements of the cloud is deduced from the time necessary for the emitted pulse to make the round trip between the antenna and the cloud at the speed of light. This time simply corresponds to the time period between emitting a pulse and receiving its echo. Estimating the size of a cloud entails estimating its volume, i.e. its depth and the maximum horizontal distance over which it extends, as well as its elevation, i.e. the maximum vertical distance over which it extends. The estimate of the area results from processing the azimuth scanning of the radar beam, while the estimate of the elevation results from processing the scanning in elevation of the radar beam. An airborne meteorological radar system continually scans a wide field in azimuth, the extent of which is of the order of +/−90 degrees with respect to the direction flown by the aircraft. The field scanned in elevation is smaller, typically of the order of 10 degrees for an observation distance exceeding 40 nautical miles.

Now, in the context of an airborne application, the carrier is in continuous movement. The pitch, yaw and roll angles of an aircraft vary all the time, which greatly complicates the logic of scanning in azimuth and in elevation of the meteorological volume in front of the aircraft. This is one of the technical problems that the present invention proposes to solve.

The solution most often used is to employ mechanical scanning with respect to two axes. This mechanical scanning on the one hand compensates the unintentional pitch and yaw motion of the aircraft. It also scans the forward space by effecting scans in horizontal layers for a series of elevations of the antenna beam. This solution represents a particularly severe penalty in the case of a multimode radar system. The antenna of a multimode radar system can be called upon not only to scan a large meteorological volume but also to insert supplementary measurements outside of the meteorological volume. Note that multimode scanning of the meteorological field requires a beam agility that is difficult to obtain mechanically because of the mechanical inertia of the antenna, which necessitates high motor torques, which severely tests the motors and therefore the reliability of the system. This implies overspecification of the entire system, representing a penalty as much in terms of weight as in terms of electrical power consumption and finally of cost. Based on a purely mechanical solution with two rotation axes, the inertia of the antenna can be compensated only by overspecifying the motors, which represents a penalty in the context of an airborne application. This type of motorized antenna radar system also functions by scanning the meteorological volume in horizontal layers. Consequently, for a given azimuth, there is a significant delay between measurements for the upper portion of the meteorological volume and measurements for the lower portion. As a result the measurements in a vertical slice are hardly contemporaneous, which induces an inaccuracy term into the vertical processing of the signals. One solution that could be envisaged would be to have the antenna effect mechanical scanning, but the inevitable conclusion is that, because of the small vertical extent of the field, the frequency of the antenna turnaround phases would impose a heavy penalty on the efficiency of the radar system, i.e. the ratio between the time usable by the radar function and the overall time.

There are also frequency dispersive antennas that vary the pointing direction of the beam by varying the feed frequency of the antenna. A meteorological radar system using a frequency dispersive antenna could be envisaged. However, most such antennas have a large overall size and are not well suited to onboard applications. Frequency dispersive antennas use a rear face waveguide to feed by coupling a front-face radiating waveguide, the radiating waveguide forming the antenna as such. Because of constraints linked to this coupling, the feed waveguide must be disposed behind the antenna in a plane perpendicular to the antenna, whence a large overall size. There is a solution whereby the feed waveguide is pressed flat against the back of the antenna, as described in the French patent application filed Jun. 3, 2005 and published under the number FR 2 886 773. However, this latter solution notably has the drawback of using oblique waveguides, on the front face and on the rear face. Such waveguides, the complex wave paths whereof include many diversions, can be difficult to fabricate. This impacts on the cost of the antenna, which can become prohibitive, notably in the case of a civil application such as a meteorological radar system.

Even more complex alternative solutions could be envisaged, based on electronic scanning by variable microwave phase-shifters. Used more particularly in military applications, such solutions are not well suited to meteorological radar systems. Given the low reflectivity of the voluminous targets that clouds form, a meteorological radar system necessitates secondary and diffuse lobe levels below −30 dB at the radiation maximum. To achieve such performance, a very large number of phase-shifters would be required, or a smaller number having a very low resolution quantizing function, and thus a large number of bits. Apart from the fact that power consumption would be very high, the large number of phase-shifters or the use of phase-shifters with a large number of bits would make the cost of the antenna prohibitive. Moreover, the reliability of an electronic scanning antenna using microwave phase-shifters continues to be more difficult to guarantee than that of a mechanical antenna, as secondary and diffuse lobe performance can deteriorate rapidly with failures of phase-shifters or their control circuits.

SUMMARY OF THE INVENTION

An object of the present invention is notably to alleviate the drawbacks cited above by exploiting the principle of frequency dispersive antennas to vary the beam pointing angle in elevation. The present invention proposes a compact and ingenious solution for coupling between a serpentine feed waveguide and slotted radiating waveguides. To this end, the invention consists in an antenna including a plurality of radiating waveguides disposed so that their wave paths are parallel two by two and a feed waveguide having a wave path forming a flat zigzag serpentine pattern. The feed waveguide is disposed against the radiating waveguides so that a longitudinal axis of the pattern of the feed waveguide intersects the radiating waveguides at an angle of substantially 90 degrees. The feed waveguide includes coupling elements on its face in contact with the radiating waveguides. The radiating waveguides are straight and the straight portions of the zigzag wave path in the feed waveguide form a non-zero angle with the wave paths of the radiating waveguides, so that the coupling elements feed the radiating waveguides.

The feed waveguide can advantageously function in traveling mode and the radiating waveguides in resonant mode.

In one embodiment the coupling elements can be slots, a slot being disposed at the intersection of each axis of a radiating waveguide with the axis of a rectilinear portion of the feed waveguide.

The feed waveguide can advantageously be fed at variable frequency. The direction of a beam radiated by a radiating waveguide then varies in a plane with the feed frequency of the feed waveguide.

In one embodiment the antenna can be mobile about at least one axis, so that the direction of the beam radiated by a radiating waveguide can be scanned mechanically in a plane, the mechanical scanning of the antenna being motorized.

For example, the antenna can be used in a radar system, the mechanical scanning of the antenna providing for scanning in azimuth and/or in elevation, the variation of the feed frequency providing scanning in elevation. The radar system can be an airborne meteorological radar system.

The invention equally consists in a method of fabricating such antennas. The method includes a step of assembling a first structure, formed by channels recessed in a plate, the channels including slots in their recesses, to one face of a plane plate including slots. The method equally includes a step of assembling a second structure, formed by a channel bent into a flat zigzag serpentine, to the other face of the plate. The plate closes the channels forming the first structure and closes the channel forming the second structure, transforming the first structure into a plurality of radiating waveguides and the second structure into a serpentine waveguide. The slots in the plate provide the coupling between the waveguide and the plurality of radiating waveguides.

For example, the first structure, the plate and the second structure can be brazed together in a vacuum or salt bath.

The main advantages of the invention are also that it provides satisfactory beam agility without the additional costs that complex electronic scanning solutions usually cause. The complexity of an array of phase-shifters penalizes not only the design and manufacturing costs, but also maintenance costs through a lack of reliability of the additional components. In contrast, the present invention improves the reliability of the conventional civil solution by considerably restricting the loads on the motors, the electrical power consumption and wear whereof are incidentally reduced. Having two means of moving the beam, one mechanical for the slow movements and the other electronic for the fast movements, enhances the operation of the system and its reliability. In practice, if more than one mode is activated, compromises are arrived at between beam agility and reliability. The simple design of an antenna of the invention means that it can be validated without difficulty.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
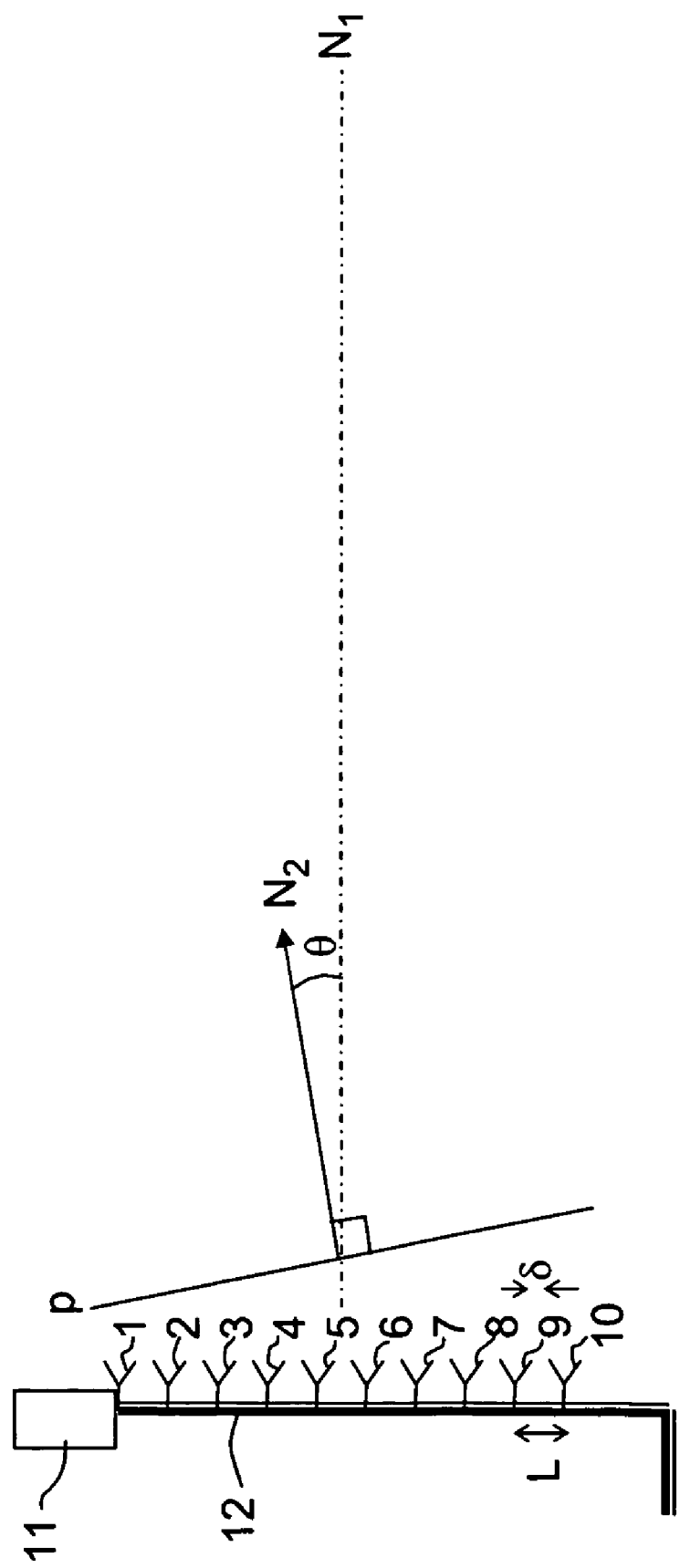
FIG. 1 is a lateral view illustrating the principle of shifting the phase of the send channels of a radiating array to achieve scanning of the beam.

FIG. 1 is a lateral view of an antenna illustrating the principle of shifting the phase of the send channels of a radiating array to achieve scanning of the beam. A matched load 11 terminates a vertical feed waveguide 12 including radiating sources or send channels 1, 2, 3, 4, 5, 6, 7, 8, 9 and 10. The feed channels of the radiating waveguides can be slots in the waveguide 12, for example. They constitute a vertical radiating array. The general principle of electronic scanning is to shift the phase of the send channels of the radiating array relative to each other so that the phase of the microwave signal in two-dimensional space occupied by the sources of the array forms a plane P referred to as the "wave plane" or the "phase plane", a normal $N_2$ to the plane P indicating a pointing direction θ of the beam relative to a normal $N_1$ to the radiating array. The present invention proposes to control the phase plane P without using variable phase-shifters. The idea is to create the phase plane P by line lengths for which the guided wavelength variation over a frequency range induces a variation of the phase proportional to the ordinate of the radiating source. This principle is explained in more detail hereinafter.

Between two sources or horizontal groups of n sources (n≧2) vertically spaced by a distance δ, a wave traveling in the waveguide 12 travels a physical distance L such that L>δ a priori. L is referred to as the "electrical path" or the "electrical distance". If $\lambda_g$ is the guided wavelength at a frequency f in the feed waveguide 12 and if $\phi_n$ is the phase difference between the first source and the n$^{th}$, the following equation (1) can be written:

$$\varphi_n = \frac{2\pi}{\lambda_g} \cdot n \cdot L \tag{1}$$

If $\{A_n\}$ is the set of amplitudes of the waves incident on the first n sources by coupling, the radiation diagram $G(\theta)$ of the resulting antenna in the elevation plane is given by the following equation (2), in which $\lambda$ is the wavelength in a vacuum at the frequency f concerned:

$$G(\theta) = \sum_n A_n \cdot e^{j(\frac{2\pi}{\lambda} \cdot n \cdot \delta \cdot \sin(\theta) - \varphi_n)} \tag{2}$$

Equation (2) yields a radiation maximum or main lobe at $\theta_0$ given by the following equation:

$$\sin(\theta_0) = \frac{\lambda}{\delta} \cdot \left( \frac{L}{\lambda_g} - \frac{k}{2} \right) \tag{3}$$

In equation (3), the term k is an even or odd integer depending on L and on the average pointing of the beam, whereby the sine is between −1 and +1.

The ratio $$\frac{\lambda}{\lambda_g}$$

varying with the frequency f applied to the feed waveguide 12, it follows from equation (3) that the pointing angle $\theta$ can be varied a few degrees by varying the frequency f. What is more, the sine function being an increasing monotone function, the greater the line length L between two radiating sources, the greater the angular range $\Delta\theta$ available for a given frequency band.

Differentiating equation (3) yields the following equation (4):

$$\Delta\theta = \frac{1}{\delta \cdot \cos\theta_0} \left[ L \frac{\left(\frac{\lambda_0}{\lambda_c}\right)^2}{\sqrt{1 - \left(\frac{\lambda_0}{\lambda_c}\right)^2}} + \frac{k}{2} \cdot \lambda_0 \right] \cdot \frac{\Delta f}{f_0} \tag{4}$$

Noting that the angle $\theta_o$ is generally small, it is deduced from equation (3) that the integer k is very close to $2 \cdot L/\lambda_g$ and the angular range $\Delta\theta$ takes the more explicit form (5) highlighting the amplifying role of the ratio $L/\delta$.

$$\Delta\theta \approx \frac{L}{\delta \cdot \cos\theta_0} \frac{\lambda_g}{\lambda} \cdot \frac{\Delta f}{f_0} \tag{5}$$

Figure 2:
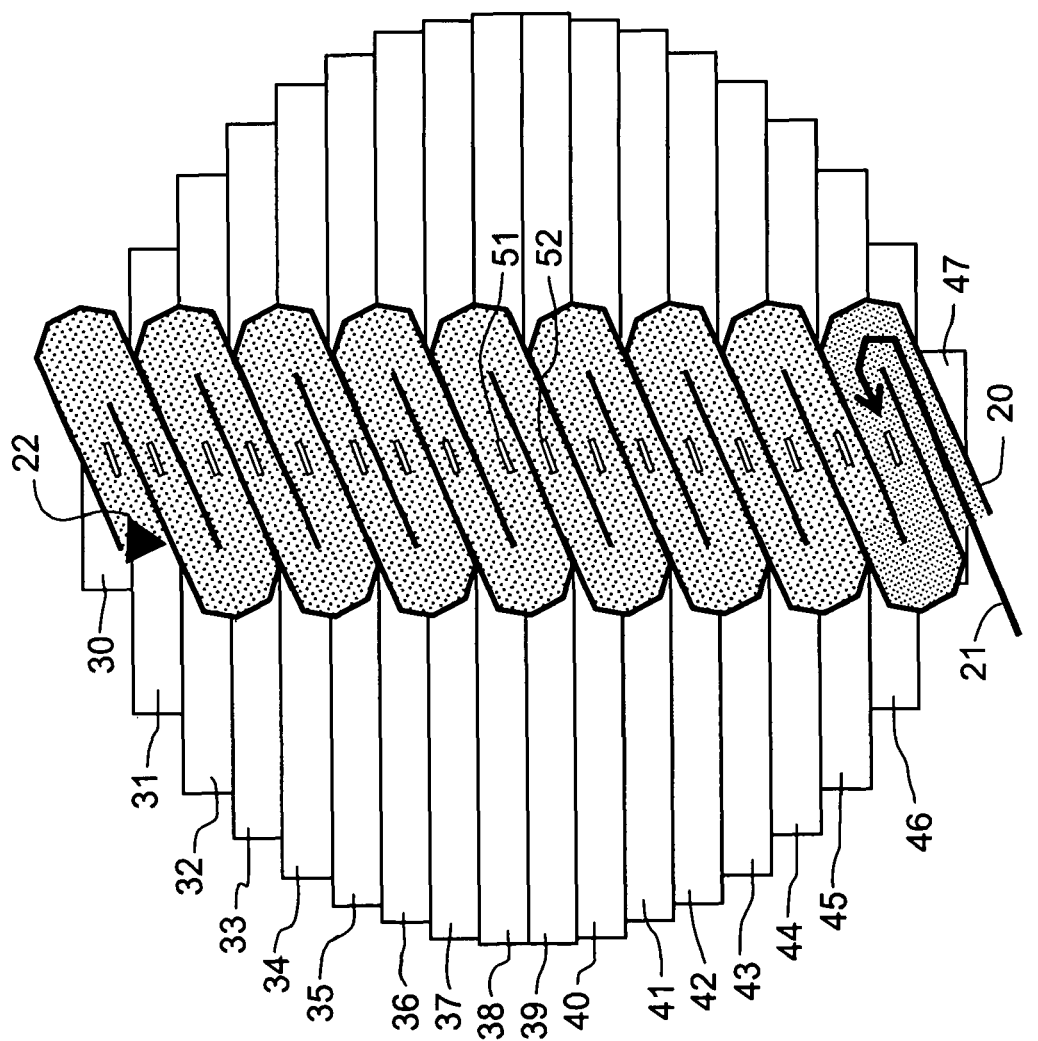
FIG. 2 is a rear view of one example of an antenna of the invention for an airborne meteorological radar system.

Where:

$\lambda_c$: wavelength at the cut-off frequency of the fundamental mode of the waveguide $f_0$: center frequency of the band
$\lambda_0$: wavelength in a vacuum at the center frequency
$\Delta\theta$: angular excursion in radians
$\Delta f$: frequency band FIG. 2 is a rear view illustrating an example of an antenna of the invention used in an airborne meteorological radar system. A feed waveguide 20 forming a flat zigzag serpentine pattern extends vertically. The waveguide 20 carries a wave 21 that serpentines upward in FIG. 2. It is clear that the path taken by the wave 21 inside the waveguide 20 is a zigzag path, the path of the wave being defined by the interior configuration of the waveguide 20. The waveguide 20 can be seen as a rectangular section tube bent flat on itself several times to form a zigzag path. The wave 21 thus propagates to the end of the waveguide 20 along a zigzag path. Hereinafter, the waveguide 20 is referred to as a "serpentine waveguide". Coupling slots all substantially identical to rectangular slots 51 and 52 are disposed regularly along the path of the wave 21 in the serpentine waveguide 20. Each coupling slot is substantially centered at half the distance between two successive bends of the zigzag forming the wave path. The coupling elements that the slots form are disposed at the intersection of the longitudinal axis of a radiating waveguide with the longitudinal axis of a rectilinear portion of the feed waveguide. Each coupling slot is oriented to produce the coupling required by the illumination law of the antenna. Seen from the exterior of the waveguide 20, these slots are oriented in the same direction but are characterized by an angle of inclination specific to the required coupling. For the radiating waveguides they constitute sources that can sample a portion of the wave 21 as it passes by, the serpentine waveguide 20 advantageously functioning in traveling mode. Propagation to the end of the serpentine waveguide 20 is achieved without reflection at the end thanks to a matched load 22 placed at the end of the line.

In the example shown, eighteen radiating waveguides 30, 31, 32, 33, 34, 35, 36, 37, 38, 39, 40, 41, 42, 43, 44, 45, 46 and 47 are disposed transversely to the feed waveguide 20, and thus in a substantially horizontal position. Seen from the rear, the feed waveguide 20 is in front of the radiating waveguides, against which the larger side the waveguide 20 is pressed flat. Each radiating waveguide takes the form of a rectangular section tube closed at its ends. Each radiating waveguide can include radiating sources, for example horizontal slots. These slots are not visible in FIG. 2, because they are on the opposite sides. Closed by a short circuit at each of its ends, each radiating waveguide can advantageously function in resonant mode. Each radiating waveguide is straight. The radiating waveguides are juxtaposed along their smaller sides with their respective middles aligned. The radiating waveguides 30 and 47 can be identical two by two, the radiating waveguides 31 and 46 can also be identical two by two, and so on up to the radiating waveguides 38 and 39, which can also be identical two by two. As shown by FIG. 2, the lengths of the radiating waveguides are such that the stack produced forms a radiating array having the general shape of a disk. This shape can be adapted to the carrier by varying the number and the length of the radiating waveguides.

The serpentine waveguide 20 bent on the smaller side and functioning in traveling mode feeds by coupling the radiating array formed by the juxtaposed radiating waveguides 30, 31, 32, 33, 34, 35, 36, 37, 38, 39, 40, 41, 42, 43, 44, 45, 46 and 47. As it passes through the waveguide 20, a portion of the wave 21 is sampled by each of the internal coupling slots, such as the slots 51 and 52, which transfer it to the radiating waveguides on the front surface. As shown by equation (1), the phase of the wave sampled by a slot depends on the electrical distance traveled to reach that slot. The internal configuration of the serpentine waveguide 20 therefore plays a major role in the present invention, because it adjusts the electrical path traveled to reach each of the slots so as to adjust the phase of the radiated wave. The slots feed by coupling the stacked radiating waveguides 30 to 47. The radiating waveguides 30 to 47 are the seat of a system of standing waves and their own slots, on their opposite sides not visible in FIG. 2, radiate into free space. This forms the radiating array. It should be noted that the serpentine shape increases the electrical distance between the coupling slots whilst maintaining them at a short mechanical distance. Bending the serpentine 20 along its smaller side is an easy way to produce a particularly compact implementation. Thus the inclination of the phase plane is more sensitive to a variation of the feed frequency. An acceptable variation of the pointing angle in elevation can be obtained even for small frequency variations, such variations being compatible with the frequency band allocated for the application.

Figure 3:
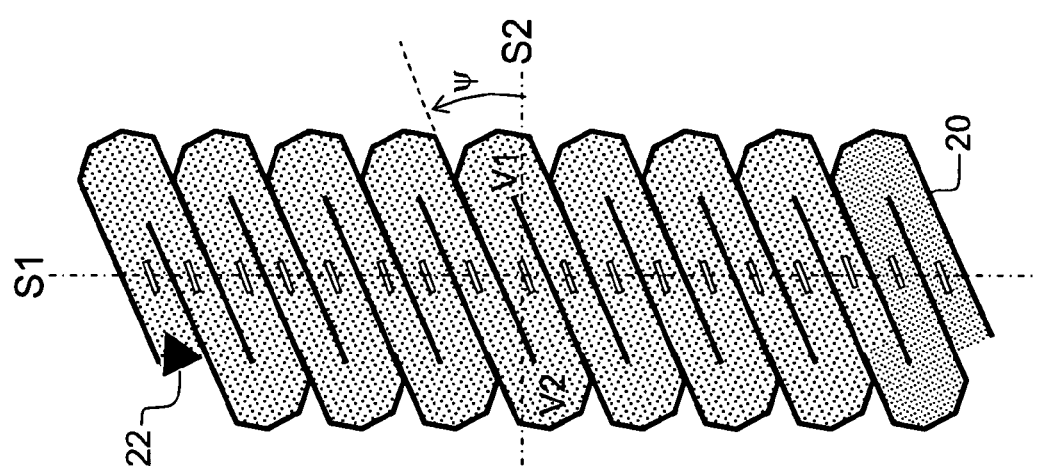
FIG. 3 is a rear view of one example of a serpentine waveguide that can be used in an antenna of the invention.

FIG. 3 shows the serpentine waveguide 20 from behind. A major problem is correctly coupling in amplitude and in phase the vertically disposed feed waveguide 20 with each of the horizontally disposed radiating waveguides 30 to 47. To ensure efficient coupling between the feed waveguide 20 and the radiating waveguides 30 to 47, they are coupled to transmit the energy required by the antenna illumination law. The present invention notably proposes using the flat zigzag serpentine feed waveguide 20, which has very particular geometrical properties. The wave path of the waveguide 20 is not symmetrical with respect to a longitudinal axis S1 with the serpentine pattern of the waveguide 20, with the result that the coupling slots are attacked alternately from above and from below. This results in a 0°/180° phase alternation that is corrected by a suitable choice of the length L of the serpentine between two coupling slots. A transverse axis S2 provides a better illustration of this property of longitudinal dissymmetry of the serpentine waveguide 20: two successive bends V1 and V2 of the zigzag forming the wave path of the feed waveguide 20 are "offset" longitudinally relative to each other, V1 being above S2 while V2 is below it. In the serpentine waveguide 20, any straight portion of the wave path between two successive bends forms a non-zero angle ψ with S2. This dissymmetry property enables the wave path of the waveguide 20 always to be slightly inclined relative to the horizontal radiating waveguides 30 to 47, against which the larger side of the waveguide 20 is pressed flat. Apart from providing a flat and compact dispersive antenna, the present invention most importantly provides an antenna of low cost because it does not necessitate a waveguide of complex shape that is therefore difficult to fabricate.

Tests have been effected by the applicant on an X band antenna of the invention suitable for multimode airborne meteorological radar systems. The antenna tested uses frequency dispersion scanning in the elevation plane, as in the embodiment of FIGS. 2 and 3. The antenna tested uses motorized mechanical scanning about a vertical axis to scan the azimuth plane and about another, horizontal axis to scan the elevation plane. Concerning here an application for an airborne multimode meteorological radar system, these mechanical scanning functions primarily compensate for changes in the attitude of the aircraft. Frequency dispersion scanning scans the observed meteorological volume. Rectangular section radiating waveguides are used, with an external dimension close to 23 millimeters for the longer side of the rectangle and an internal dimension of 5 to 10 millimeters for the shorter side. Note that this latter dimension has little influence on the parameters setting the dimensions of the antenna, such as the beam angle, but does influence the ohmic losses and the design of the radiating and coupling slots. With a feed waveguide the dimensions, or at least the larger dimension, whereof are compatible with those of the radiating waveguide, equation (3) gives a slope of 60 degrees per gigahertz for an electrical distance of 157 millimeters. This provides vertical scanning by ±3 degrees over a 100 megahertz band, which is acceptable in the case of resonant waveguides. It became apparent during the tests that the structure of the secondary lobes is not modified by variation of the pointing of the beam as a function of frequency. Electronic scanning through approximately 6 degrees on the elevation axis thus obtained by the invention was used to effect an analysis of a meteorological field at short and at long range in a single mechanical scan in azimuth. This drastically reduced the loads not only on the elevation motor, as it was not loaded at all during the tests, but also on the azimuth motor, which effected only one traverse.

Figure 4:
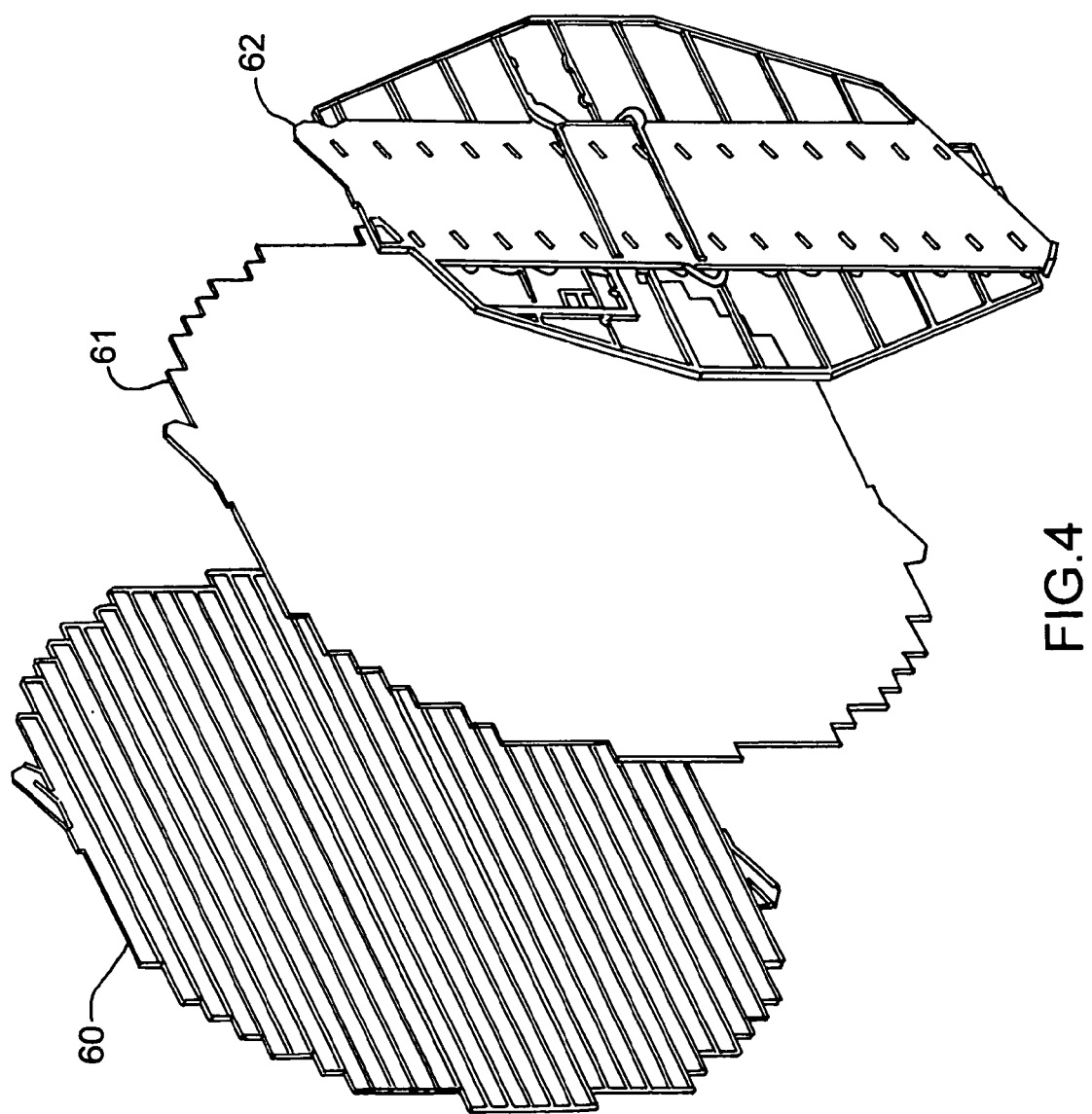
FIG. 4 is an exploded perspective view illustrating one example of the method of fabricating an antenna of the invention.

FIG. 4 illustrates an example of a method for fabricating an antenna of the invention. It shows that an antenna of the invention can easily be produced by assembling only three relatively simple components. A structure 60 includes radiating slots cut into the bottom of machined channels, not visible in FIG. 4. A plane plate 61 also includes slots that are not visible in FIG. 4. A structure 62 is formed by a channel bent into a serpentine. Sandwiched between the structure 60 and the structure 62, the plate 61 closes the channels cut into the structure 60 and closes the bent channel forming the structure 62. It therefore simultaneously transforms the structure 60 into a radiating array and the structure 62 into a serpentine bent waveguide. The slots in the plate 61 provide the coupling between the two. The three components 60, 61 and 62 are brazed together in a vacuum or salt bath. In the usual way, the radiating waveguides have small openings in the terminal short circuits to eliminate any trace of moisture caused by condensation. On the other hand, the same condensate evacuation function is provided by small openings at the bends of the serpentine, in the lower portion of the bends and optimized not to create microwave leaks that would reduce the efficiency of the antenna, and therefore its gain.

Compact and of small overall size, the antenna of the invention described hereinabove is particularly suitable for airborne applications. It varies the elevation pointing angle by varying the frequency in relatively small proportions, sufficient frequency variations even being obtainable by digital synthesis of variable waveforms. The antenna offers acceptable beam agility at low cost, thanks in particular to waveguides of simple shape that are easy to fabricate. Its cost is fairly close to that of a purely mechanical scanning antenna. Moreover, measurements effected in a vertical slice by an antenna of the invention are entirely contemporaneous, which eliminates the inaccuracy term in the vertical processing of the measured signals.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of fabricating an antenna the method comprising:

forming a first part, forming the first part comprising the steps of:

forming a plurality first channels recessed in a first plate;

forming a plurality of first slots in the recesses of the channels;

forming a plane plate, forming the plane plate further comprising forming a plurality of second slots in the plane plate;

forming a second part, forming the second part comprising bending a second channel into a flat zigzag serpentine;

attaching the first part to one face of the plane plate;

attaching the second part to the other face of the plane plate, wherein the plane plate closes the first channels forming a plurality of straight radiating waveguides disposed so that wave paths of the plurality of radiating waveguides are parallel two by two, the plane plate closes the second channel forming a serpentine feed waveguide, the feed waveguide being disposed flat against the plurality of radiating waveguides so that a longitudinal axis (S1) of the feed waveguide intersects the plurality of radiating waveguides at an angle of substantially 90 degrees, coupling elements on a face of the feed waveguide are in contact with the radiating waveguides and straight portions of the zigzag wave path in the feed waveguide form a non-zero angle ($\psi$) with the wave paths of the radiating waveguides, so that the coupling elements feed the radiating waveguides, and the plurality of second slots in the plane plate adapted to couple electromagnetic radiation between the feed waveguide and the plurality of radiating waveguides.

2. The method as claimed in claim 1, wherein the first part, the plane plate and the second part are brazed together.

3. The method as claimed in claim 1, wherein the feed waveguide is adapted to function in traveling mode.

4. The method as claimed in claim 1, wherein the radiating waveguides are adapted to function in resonant mode.

5. The method as claimed in claim 1, wherein the plurality of second slots are formed at the intersection of each axis of a radiating waveguide with the axis of a rectilinear portion of the feed waveguide.

6. The method as claimed in claim 1, wherein the feed waveguide is adapted to be fed at variable frequency, the direction ($\theta$) of a beam radiated by a radiating waveguide varying in a plane with feed frequency of the feed waveguide.

7. The method as claimed in claim 1, wherein the fabricated antenna is adapted to be mobile about at least one axis, so that the direction of beam radiated by a radiating waveguide can be scanned mechanically in a plane.

8. The method as claimed in claim 7, wherein the mechanical scanning of the antenna is adapted to be motorized.

9. The method as claimed in claim 8, wherein the fabricated antenna is adapted to be used in a radar system, mechanical scanning of the antenna providing scanning in azimuth and/or in elevation, the variation of a feed frequency providing scanning in elevation.

10. The method as claimed in claim 9, wherein the radar system is a meteorological radar system.

11. The method as claimed in claim 10, wherein the radar system is adapted to be airborne.

* * * * *